United States Patent
Yamamoto

(10) Patent No.: US 6,741,325 B2
(45) Date of Patent: May 25, 2004

(54) METHOD AND APPARATUS FOR PRINTING PHOTOGRAPHS FROM DIGITAL IMAGES USING EXISTING DPE MINI LABS

(75) Inventor: Katsumi Yamamoto, Shanghai (CN)

(73) Assignee: Omni Vision International Holding Ltd, Grand Cayman (KY)

( * ) Notice: Subject to any disclaimer, the term of this patent is extended or adjusted under 35 U.S.C. 154(b) by 0 days.

(21) Appl. No.: 10/269,310

(22) Filed: Oct. 11, 2002

(65) Prior Publication Data

US 2004/0070739 A1 Apr. 15, 2004

(51) Int. Cl.$^7$ .................. G03B 27/00; G03B 27/32; G03B 27/62; G03B 27/72; H04N 1/21
(52) U.S. Cl. .............. 355/18; 355/32; 355/71; 355/75; 355/77; 358/302
(58) Field of Search ................ 355/18, 27, 32, 355/40, 71, 74, 75, 77; 358/302; 348/207.2

(56) References Cited

U.S. PATENT DOCUMENTS

| | | | |
|---|---|---|---|
| 5,583,610 A | | 12/1996 | Yoshikawa |
| 5,652,661 A | * | 7/1997 | Gallipeau et al. ........... 358/302 |
| 5,801,814 A | * | 9/1998 | Matsumoto .................. 355/40 |
| 6,272,293 B1 | | 8/2001 | Matama |
| 6,304,313 B1 | * | 10/2001 | Honma ........................ 355/18 |
| 2003/0016336 A1 | * | 1/2003 | Nishikawa ................... 355/32 |

* cited by examiner

Primary Examiner—Alan Mathews
(74) Attorney, Agent, or Firm—Perkins Coie LLP

(57) ABSTRACT

A method for exposing photographic paper is disclosed that utilizes existing DPE processing labs. The method comprises illuminating a light transmittance device, the light transmittance device being controlled to display a digital image to be printed onto the photographic paper. The photographic paper is then exposed with the light transmitted through said light transmittance device.

5 Claims, 1 Drawing Sheet

METHOD AND APPARATUS FOR PRINTING PHOTOGRAPHS FROM DIGITAL IMAGES USING EXISTING DPE MINI LABS

TECHNICAL FIELD

The present invention relates to the printing of photographs from digital images, and more particularly, to the printing of digital images using existing DPE mini labs.

BACKGROUND

The use of digital still cameras (DSC) has exploded in recent years. A digital still camera can take an electronic or digital image using the camera's image sensor and store the image digitally in some type of memory medium. As the resolution of digital still cameras have increased, the quality of the digital image is now sufficient in many circumstances to displace photographs taken by conventional photographic film.

Once the digital image has been captured by the DSC, the digital image is transferred to a personal computer. At that time, the photographer can electronically manipulate the image, such as by cropping, exposure control, zoom, etc. In order to get a physical photographic print, typically the photographer will print the digital image on a printer. The capital and consumable cost for the personal computer, printer, paper, and ink can be relatively expensive when compared to photographic film processes.

For example, a person with a digital still camera would require a personal computer and a printer to have a physical print of the digital images. Alternatively, the user may transmit the digital images to a third party that may perform the printing function. In any event, the process is still relatively expensive.

The process for developing and printing from photographic film is well known. For example, after the film has been exposed by capturing images using a camera, the film is provided to a film processor, which develops the film into a "negative". The developed negative film is then used to print photographs, typically using an exposure and development process for the photographic paper. Because of the extensive previous use of photographic film, the technology developed for the processing of photographic film and prints is well established. Thus, the price of each photograph is now relatively low.

Additionally, in many parts of the world, completely self-contained "minilabs" are prevalent. These minilabs are also referred to as a DPE. The DPE equipment represents a fairly high capital expenditure that has been already invested to service the photography market that uses conventional photographic film. The transition from photographic film to digital imagery risks rendering this capital expenditure obsolete. An example of a DPE minilab is shown in U.S. Pat. No. 5,583,610 to Yoshikawa. As seen in FIGS. 2 and 3 of the '610 patent, the processing apparatus includes an exposure portion in which images recorded on a negative film are exposed and a processor portion in which exposed photographic paper is subject to developing processing. Currently, these DPE mini labs are not suited for, nor adapted to, the processing of digital images.

DETAILED DESCRIPTION

The present invention relates to the retrofitting of a DPE minilab to accommodate the printing of photographic prints from digital images. In the following description, numerous specific details are provided to provide a thorough understanding of the embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout the specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout the specification are not necessarily all referring to the same embodiment. Furthermore, the particular features, structures, or characteristics may be combined in any suitable manner in one or more embodiments.

Figure 1:
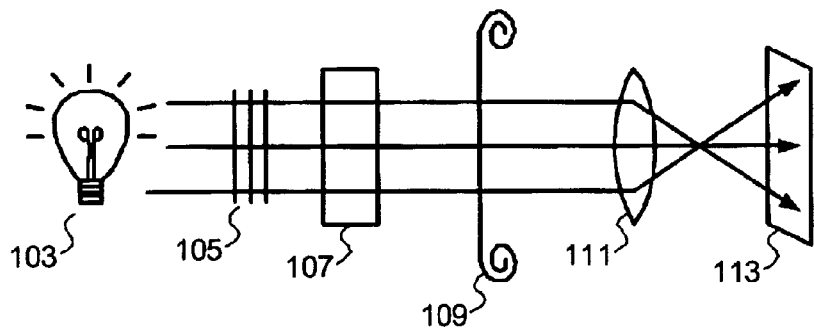
FIG. 1 is a schematic illustration of a prior art photographic film exposure system.

FIG. 1 shows a simplified prior art schematic illustration of system for exposing photographic paper using a negative film. In particular, the system 101 includes a light source 103, filters 105, condensing lens 107, negative film 109, lens 111 and photographic paper 113. In operation, the light 103 provides a broad spectrum of light that travels through filters 105 and condenser lens 107. The filters 105 and condenser lens 107 are operative to condition the light prior to transmittal through the negative film 109. After the light travels through the negative film 109, it is focused onto the photographic paper 113 by the lens 111. Following this exposure process, the photographic paper 113 is then developed using a developing process. The foregoing description is described in greater detail in the '610 patent referenced above and is standard for DPE-type minilabs. Note that the photographic paper 113 is developed in a different portion of the minilab. The developing of the photographic paper 113 in both the prior art embodiment of FIG. 1 and the present invention shown in the FIG. 2 is identical.

However, because the DPE minilabs of the prior art require the use of negative film 109, with the advent of digital images, these DPE mini labs are rendered useless. The present invention seeks to modify the existing infrastructure, i.e., the existing DPE minilabs, to accommodate the use of digital images for generating photographic prints. To a large extent, the required modifications do not effect a large majority of the DPE mini lab structure. For example, the entire apparatus for developing the photographic paper is left undisturbed. Moreover, much of the exposure portion of the DPE mini lab is left unchanged. Indeed, only the negative film 109 is replaced with a liquid crystal display (LCD) or other type of light transmitting device that can be used to selectively display the digital image. The term "display" as used herein is not necessary limited to the visual perception by a human eye, but rather any manipulation of the LCD so as to selectively allow light to be transmitted (or reflected as the case may be) through the LCD in a representative manner to the digital image to be printed.

Figure 2:
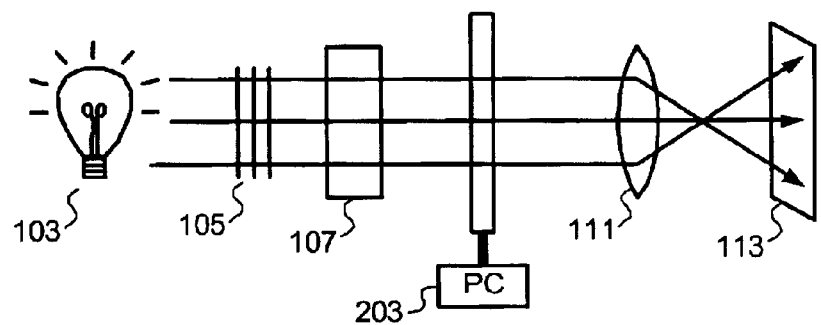
FIG. 2 is a schematic illustration of a digital image exposure system formed in accordance with the present invention.

FIG. 2 shows such a modification. In particular, the negative film 109 has been replaced by, in this embodiment, an LCD display 201. It should be noted that the LCD display 201, in one embodiment, is capable of reproducing substantially all of the visible spectrum of light, i.e., being able to modulate all of the visible spectrum of light. In such a situation, the filters 105 may in certain circumstances be removed. The LCD display 201 may be a high resolution liquid crystal display comprised of hundreds of thousands, if not millions, of discreet pixels. Each pixel can be electronically controlled to allow the transmittance of light. Moreover, by appropriately applying color filters to the LCD pixels, a full color spectrum can be approximated onto the photographic paper 113. In other embodiments, the pixels do not require color filters, but rather can directly manipulate the color of the light to be transmitted. Indeed, various types of LCD or other light manipulating apparatus can be used. The only requirement is that the LCD 201 (or equivalent) by able to accept as input the digital image data and configure itself to transmit (or reflect as the case may be) light representative of the digital image.

In one specific embodiment, the LCD panel 201 is similar to that used in many laptops and desktop computer displays. In such displays, a fluorescent lamp is used to back light the LCD display and each pixel in the LCD display is modulated in accordance with a desired image to selectively transmit the back lit fluorescent light to the viewer, thereby simulating an image. The same principles are applied to the present invention, where the LCD display 201 can be modulated by the digital image data to allow selective transmission of light from the fight source 103 onto the photographic paper 113. In this manner, the infrastructure of the DPE mini lab can be used to print photographs of digital images with minor modifications to the apparatus. Moreover, because the digital image is stored in memory, it is much less subject to degradation relative to conventional negative film 109.

While the LCD display 201 may have a variety of spectral characteristics, in one embodiment, it is advantageous to have the LCD display 201 have a spectral profile of the various pixels to ensure high resolution and color image on the actual photographic paper 113.

As seen in FIG. 2, the LCD display 201 can be controlled by a personal computer 203. The personal computer 203 can receive the electronic digital images and adapt them for presentation onto the LCD display 201. A photographer can transfer the digital images to the PC 203 in any number of ways. For example, the images can be transferred via email, wireless transmission, physical memory medium, or direct connection to the PC 203. The PC 203 is operative to selectively cause the LCD display 201 to project to the digital images.

Thus, in summary, the DPE minilabs already in existence throughout the world may be retrofitted to generate photographic prints not from negative film, but from digital images. While the specific modifications to the DPE minilabs will vary according to the particular construction of the various minilabs, the modification would generally only involve the substitution of the negative film mounting and handling apparatus with the LCD display 201. Undoubtedly, orientation and focusing would be necessary to ensure good quality prints.

Further, while a PC 203 (shown in FIG. 2) is used to control the LCD display 201, the functions of the PC 203 may be incorporated into the electronic control apparatus of the minilab. The vast majority of minilabs include some type of computer control. This computer control can easily be adapted to handle the input of digital images and the control of LCD display 201. From the foregoing, it will be appreciated that specific embodiments of the invention have been described herein for purposes of illustration, but that various modifications may be made without deviating from the spirit and scope of the invention. Accordingly, the invention is not limited except as by the appended claims.

What is claimed is:

1. A method for utilizing existing DPE mini-lab capital resources comprising:

identifying DPE mini-lab machinery that utilizes photographic negative film to expose photographic paper, said DPE mini-lab including color filters and/or a negative film carrier;

removing said color filters and/or negative film carrier from said DPE mini-lab machinery;

inserting a light transmittance device into said DPE mini-lab machinery in substantially the same space as said color filters and/or negative film carrier, said light transmittance device being controlled to display a digital image to be printed onto said photographic paper; and utilizing said DPE mini-lab machinery to process digital still photos by exposing said photographic paper with light transmitted through said light transmittance device.

2. The method of claim 1 wherein said light transmittance device is an LCD display.

3. The method of claim 2 wherein said LCD display comprises a plurality of pixels arranged in a two-dimensional array.

4. The method of claim 3 further including controlling said LCD display using a computing means to cause said LCD display to emulate said digital image.

5. The method of claim 1 further including focusing the transmitted light from said light transmittance element using a lens onto said photographic paper.

* * * * *

UNITED STATES PATENT AND TRADEMARK OFFICE
CERTIFICATE OF CORRECTION

PATENT NO. : 6,741,325 B2
DATED : May 25, 2004
INVENTOR(S) : Katsumi Yamamoto

It is certified that error appears in the above-identified patent and that said Letters Patent is hereby corrected as shown below:

Column 3,
Line 26, "fight" should be -- light --;

Signed and Sealed this

Thirtieth Day of November, 2004

JON W. DUDAS
*Director of the United States Patent and Trademark Office*